United States Patent

Kongsgaard et al.

[11] Patent Number: 5,687,534
[45] Date of Patent: Nov. 18, 1997

[54] FRAME ELEMENT AND INSERTION ELEMENT FOR STABLES

[75] Inventors: Bjarne Kongsgaard, Ikast; Knud Haargaard, Horsens; Thomas Olsen, Soroe, all of Denmark

[73] Assignee: Ikadan System A/S, Ikast, Denmark

[21] Appl. No.: 382,010

[22] PCT Filed: Aug. 10, 1993

[86] PCT No.: PCT/DK93/00258

§ 371 Date: Jun. 23, 1995

§ 102(e) Date: Jun. 23, 1995

[87] PCT Pub. No.: WO94/04021

PCT Pub. Date: Mar. 3, 1994

[30] Foreign Application Priority Data

Aug. 11, 1992 [DK] Denmark ................. 1006/92

[51] Int. Cl.$^6$ .................................................. E04C 2/42
[52] U.S. Cl. .................. 52/664; 52/660; 119/508; 119/528; 119/529; 119/530
[58] Field of Search .................... 119/529, 528, 119/530, 525, 508, 509; 52/660, 664, 20, 177, 180; 404/26

[56] References Cited

U.S. PATENT DOCUMENTS

| | | | |
|---|---|---|---|
| 529,569 | 11/1894 | Thayer et al. | 119/528 |
| 1,676,570 | 7/1928 | Mugler | 119/528 X |
| 3,181,503 | 5/1965 | Tripp | 119/508 |
| 3,626,904 | 12/1971 | Hatten et al. | 119/530 |
| 3,633,548 | 1/1972 | Kepple | 119/529 |
| 3,809,014 | 5/1974 | Jones et al. | |
| 3,864,887 | 2/1975 | Arens | 52/664 |
| 3,921,350 | 11/1975 | Van Schoyck | 119/530 X |
| 4,008,548 | 2/1977 | Leclerc | 52/180 |
| 4,348,840 | 9/1982 | Strader et al. | 52/180 |
| 5,364,204 | 11/1994 | MacLeod | 52/180 X |

FOREIGN PATENT DOCUMENTS 2738770 3/1979 Germany.

*Primary Examiner*—Carl D. Friedman
*Assistant Examiner*—Aimee E. McTigue
*Attorney, Agent, or Firm*—Watson Cole Stevens Davis, P.L.L.C.

[57] ABSTRACT

A modular flooring system for stables is made up of a plurality of modules that each include a frame element (1) and an insertion element (30). Each frame element (1) is equipped with supporting profiles (6,7) intended for the support of the insertion element (30), which is placed in the frame element when in use. The insertion elements can be easily replaced in accordance with the type of animals expected to be walking thereon.

10 Claims, 5 Drawing Sheets

FRAME ELEMENT AND INSERTION ELEMENT FOR STABLES

BACKGROUND OF THE INVENTION

The present invention relates to a flooring, especially for stables and of the type composed of module elements.

Stable floorings may be composed of grid elements, which are arranged in a support, preferably in the form of a flat iron, supporting the module elements which are placed on an existing floor. Such grid elements are mainly produced from steel, concrete or plastic. Particularly for the use in pigsties, a further flooring is used which is composed of plate elements which are heatable. These plates are intended for piglets.

It is a common feature of the known floorings that the elements form an integrated unit which, for certain types, may be connected with adjacent elements. This integrated unit comprises a support surface, supporting profiles and possible connecting devices. The supporting profiles may be designed for cooperation with other supporting devices such as support rails.

If a change of the support surface itself is required, it is necessary to replace the whole grid/plate element including supporting profiles and connecting devices. This is undesirable since the replacement of the support surface is thus made very labour- and time-consuming.

A further disadvantage of using grid/plate elements composed of an integrated unit of support surface, supporting profiles and possible connecting devices occurs if the elements are intended for connection with one another either through the use of connecting devices or through the use of common supporting devices. Owing to inaccuracies and differing tolerances in the production of steel concrete and plastic elements, respectively, it may be problematic to make elements produced from different materials cooperate. Thus, it is difficult to use elements in different materials in the same stable although in many cases this is desirable.

Accordingly, the object of the present invention is to provide a flooring which does not possess the above-mentioned disadvantages and which makes it possible to replace the support surface itself without the need to replace the entire grid/plate element, while at the same time it is made possible for the part of the grid/plate element comprising the supporting profiles to be connected to an adjacent element or to common supporting devices whether the supporting surface is produced from steel, concrete, or plastic.

SUMMARY OF THE INVENTION

This object is obtained by a flooring which is characterized in that each module element consists of a frame element and an insertion element which is supported within the frame element, as the frame element is equipped with supporting profiles which extend between at least two opposed sides of the frame element, and as the supporting profiles and the sides of the frame element comprise top surfaces for supporting the insertion element in the frame element, and that the insertion element constitutes a support surface or part of a stable equipment.

According to a preferred embodiment, the frame element and the insertion element are equipped with devices for mutual cooperation so that the insertion element is connected to the frame element. Thus it is ensured that the insertion element will not rock or otherwise loosen from its rest in the frame element no matter where the animals tread on the insertion element.

Besides, the frame element will primarily be produced from plastic since this material offers possibilities for narrow and homogeneous manufacturing tolerances. This is especially advantageous if the elements are intended for mutual cooperation or for cooperation with common supporting devices.

With a flooring according to the invention it is possible in a simple and fast way to replace the support surface or the stable equipment formed by the insertion element since only the insertion element has to be replaced. Thus it is not necessary to replace the frame element, which would be considerably more time-consuming to replace than the insertion element. The insertion elements may be replaced randomly and replaced by insertion elements in any material if the insertion elements are designed to be placed in the frame element. Steel insertion elements may be placed in one element, concrete insertion elements in a second element while plastic insertion elements may be placed in a third element.

Problems will not arise relating to tolerance deviations for the respective materials of which the insertion elements are produced. This is due to the fact that the tolerance requirement related to the mounting of the insertion elements in the frame elements is considerably less than the tolerance requirement related to the connection of the frame elements to possible common supporting devices.

Problems related to the high tolerance requirement when mounting the frame elements on common supporting devices have been avoided as the frame elements are produced from the same material and placed permanently on the supporting devices. When the support surface is to be replaced it is only necessary, as mentioned, to replace the insertion elements.

Preferably, the frame element is of the type which comprises downward U-shaped grooves intended for mounting in a support rail in the form of a flat iron placed upright. Besides, according to a preferred embodiment, the frame element is provided with a toothing on one pair of opposite sides which enables the frame element to cooperate with corresponding toothings on adjacent frame elements.

The insertion element may consist of several types of stable equipment. Thus it may consist of a support surface such as a grid element or a plate element which may be equipped with temperature regulation devices in the form of heating or cooling devices on the underside. The insertion element may furthermore consist of other types of stable equipment, such as a trough, box division elements or other equipment. The insertion element may be produced from any material, however it will primarily be produced from plastics, cast iron or concrete. In case the insertion element consists of a plate with temperature regulation devices, the insertion element will primarily be produced from a material with high thermal conductivity combined with a corrosion resistance to the manure of the animals.

The insertion element and the frame element will be fastened to one another by guide pins which prevent the insertion element from being displaced horizontally in relation to the frame element. As an alternative to the use of guide pins, one may use lock pins which prevent both a horizontal and a vertical displacement of the insertion element. The mutual stability between the insertion and frame element, respectively, is vital in order that, when moving on the floor, the animals will not make the insertion element rock or become displaced.

In addition to the use of guide pins and lock pins, the frame element and/or the insertion element may be provided with devices which make it possible to fasten the insertion element by a snap device. This will allow a very fast and easy mounting and removal of the insertion element in/from the frame element. However, it must be taken into account that no risk occurs that the fastening ability of the snap device is insufficient to prevent the insertion element from rocking or being displaced under the animals' load on the element.

Furthermore, the insertion element and the frame element may be connected to one another by a hinge connection. This will provide an easy way of uncovering the floor underneath for cleaning without having to remove the insertion element completely from the frame element.

DESCRIPTION OF THE DRAWINGS

The invention will now be further explained with reference to the accompanying drawing, wherein.

DETAILED DESCRIPTION OF THE PREFERRED EMBODIMENT

Figure 1:
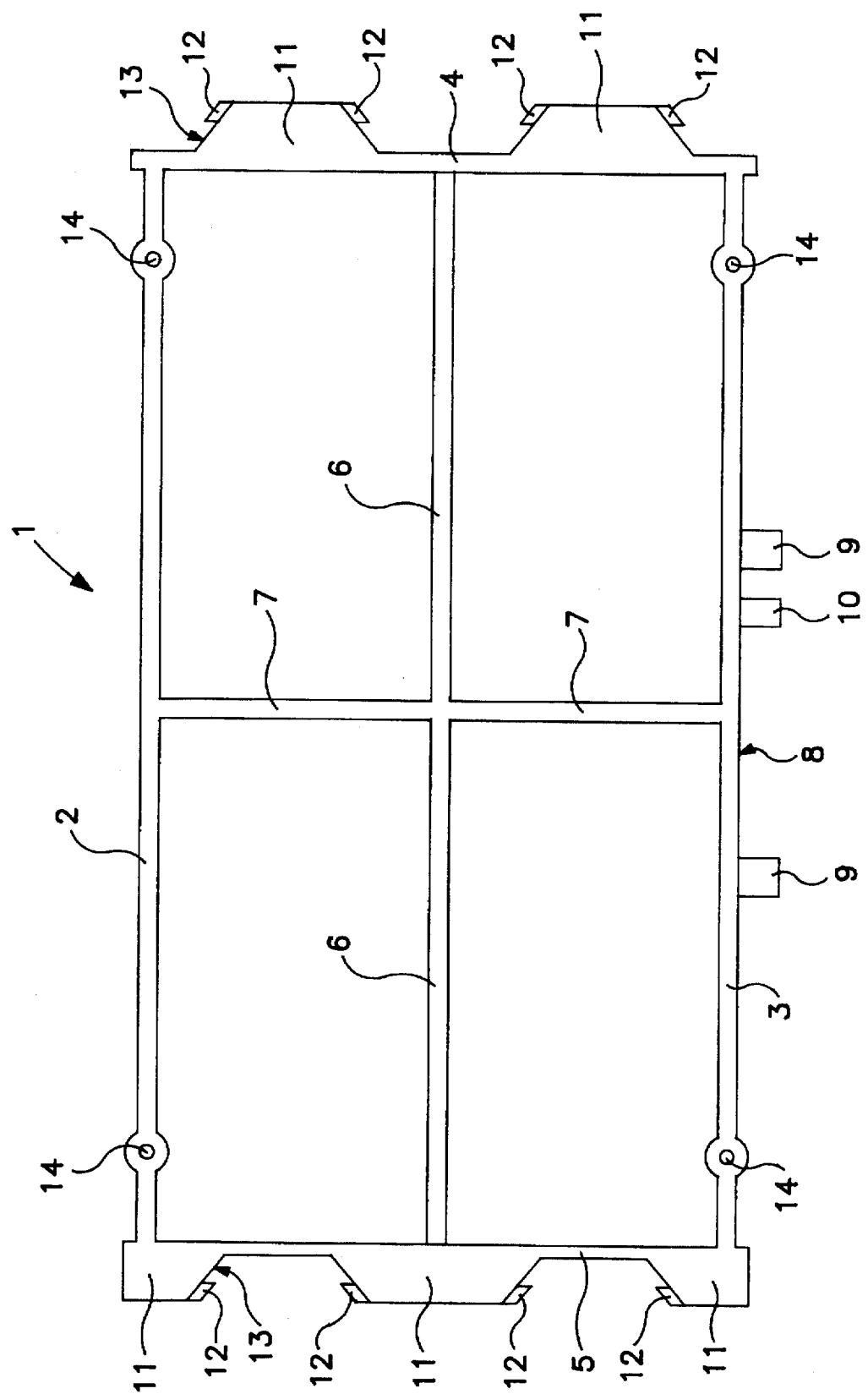
FIG. 1 is a longitudinal plane view of the frame element as seen along line 2—2; according to the invention.

FIG. 1 shows a frame element 1 seen from above. The frame element consists of four sides 2,3,4,5 which form supporting profiles, and further longitudinal and transverse supporting profiles 6,7 are mounted between these sides, which profiles furthermore serve to strengthen the frame element 1. On the outside 8 of the side 3 connecting devices are provided which are to be connected with corresponding holes formed in the opposite side of an adjacent frame element (see FIG. 2). The connecting devices comprise two lock pins 9 and a guide pin 10.

Toothings are provided on the opposite sides 4 and 5 in the form of trapezoid teeth 11 which extend horizontally from the sides. The toothing of the side 4 has a shape which is complementary to the shape of the toothing on the side 5. Thus it is made possible for the frame element 1 to interact with an adjacent frame element so as to form a flooring having a substantially unbroken surface at least in the part of the surface composed of the top side of the toothings. Each tooth 11 is equipped with projecting edges 12 which may engage under the innermost edges 13 of a tooth 11 on a corresponding frame element which is adjacent to the frame element 1.

Figure 3:
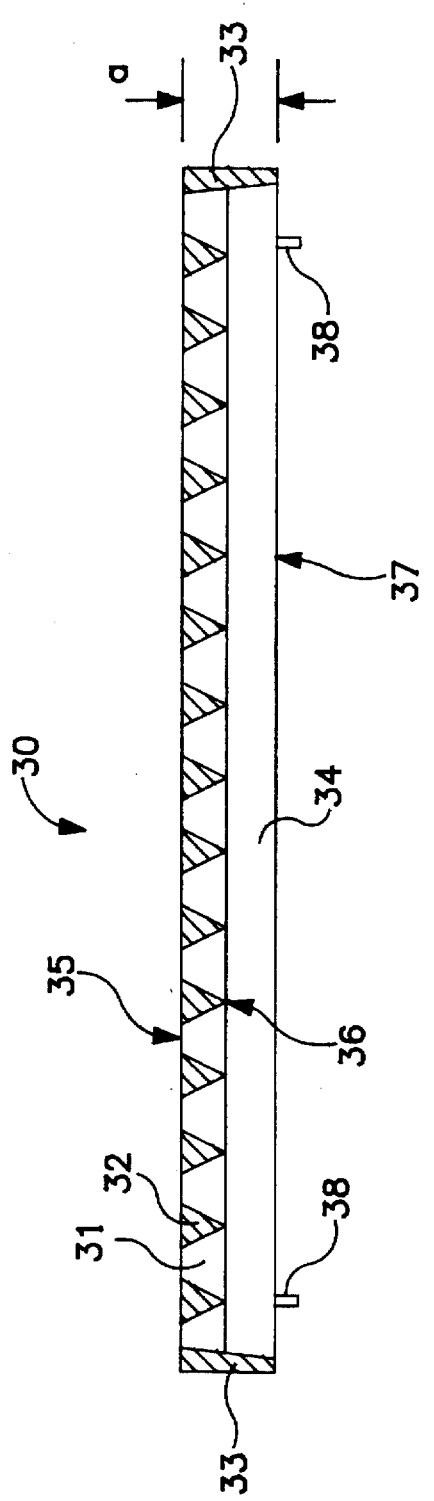
FIG. 3 illustrates a sectional view, seen from the side of an insertion element according to the invention.

The top of the sides 2,3 is equipped with holes 14 for engaging guide pins which are mounted on the insertion elements (see FIG. 3). The holes 14 extend partially into the sides 2, and the thickness of the sides is increased in these places in order to ensure sufficient strength of the frame element in the places in question.

Figure 2:
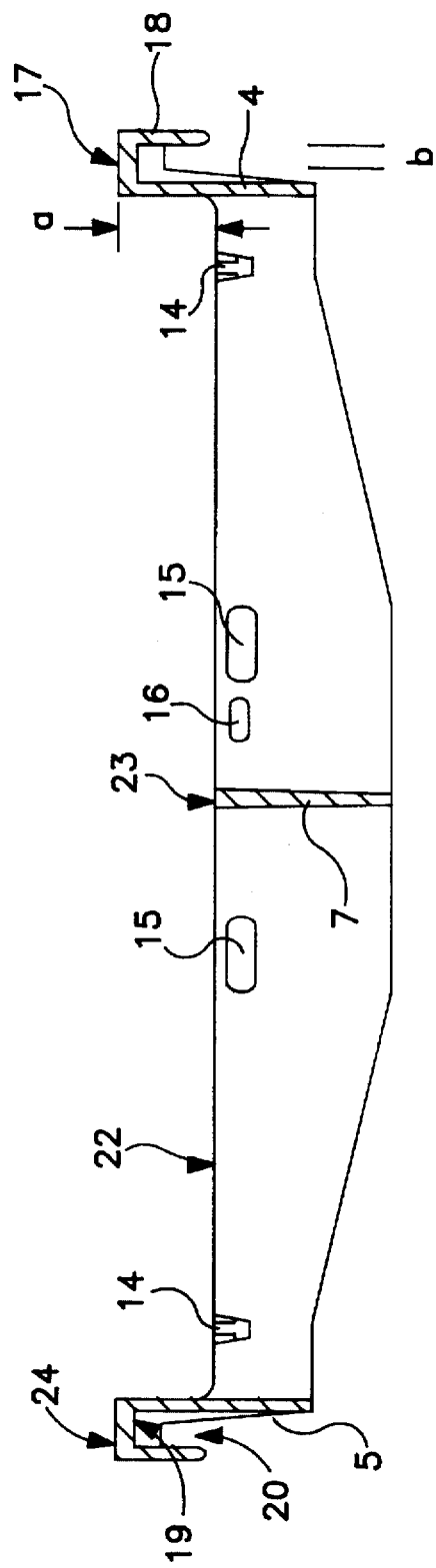
FIG. 2 illustrates a sectional view of the frame element as seen along line 2—2; in FIG. 1.

FIG. 2 shows a sectional view from the side of the frame element 1 shown in FIG. 1. The sides 2, 4, 5 are illustrated together with the transverse supporting profile 7. The side 2 is provided with holes 15, 16 intended for engagement with corresponding pins 9, 10 on the side of the adjacent frame element. The holes 15 engage with the lock pin 9, while the hole 16 engages with the guide pin 10.

The teeth 11 are seen on the sides 4, 5 and extending horizontally from these. At their tip 17, the teeth 11 are provided with a wall 18 oriented downwards and connected to the tip of each tooth. The downward oriented wall 18 is situated perpendicularly to the underside 19 of the tooth 11 and thus forms a downward U-shaped groove 20. The U-shaped groove 20 is intended to be placed over support rails in the form of flat irons (see FIG. 4), which are placed upright and situated on the stable floor. Thus, the frame element 1 will rest on the edge of the flat irons.

On the side facing towards the downward oriented wall, the sides 4, 5 are designed in such a manner that the wall thickness across a part of the surface of the side is increased gradually upwards. Similarly, the thickness of the downward oriented wall 18 is increased gradually upwards along the wall. This means that the width b of the downward oriented U-shaped groove is reduced towards the bottom of the groove. The width b of the groove at the bottom corresponds to the width of the flat iron on which the frame element 1 is placed. By making the groove slightly conical, as shown, the installation is facilitated.

The top 22 of the sides 2, which form one supporting profile, as well as the top 23 of the additional supporting profile 6 are lowered a distance a in relation to the top 24 of the sides 4, 5 and the teeth 11. When an insertion element is placed in the frame element 1, the upper surface of it will flush with the upper surface of the sides 4, 5 and the teeth 11 (see FIG. 4). Thus an unbroken surface is provided all over the surface of the module system.

FIG. 3 shows a sectional view through an insertion element 30. In the embodiment shown, the insertion element is formed by a grid with longitudinal and transverse ribs 31, 32. The outer sides 33, 34 of the insertion element are produced with a height a so that when the insertion element is placed in the frame element, the upper surface 35 of the insertion element 30 will flush with the upper surface 24 of the sides 4, 5 and the teeth 11 (see FIG. 4). According to a preferred embodiment (not shown), the ribs 31, 32 situated between the outer sides 33, 34 are also made with a height a so that these intermediate ribs may rest on the additional supporting profiles 6, 7 between the sides 2, 3, 4, 5 in the frame element 1. The ribs 31, 32, 33, 34 are designed with a downward tapering so that the manure of the animals will be led more easily down towards the lower surface 36, 37 of the ribs and into canals which are provided under the flooring formed by the module system.

The lower surface 37 of the sides 33, 34 situated along the edge of the insertion element 30 is provided with guide pins 38 intended to be inserted into the holes 14 provided in the sides 2, 3 of the frame element 1. The guide pins 38 ensure that the insertion element 30 will not be displaced horizontally in the frame element 1. If the outer edge of the insertion element is supported by supporting profiles in the frame element, it is not necessary to secure the insertion element against rocking as long as the insertion element is secured against horizontal displacement.

Figure 4:
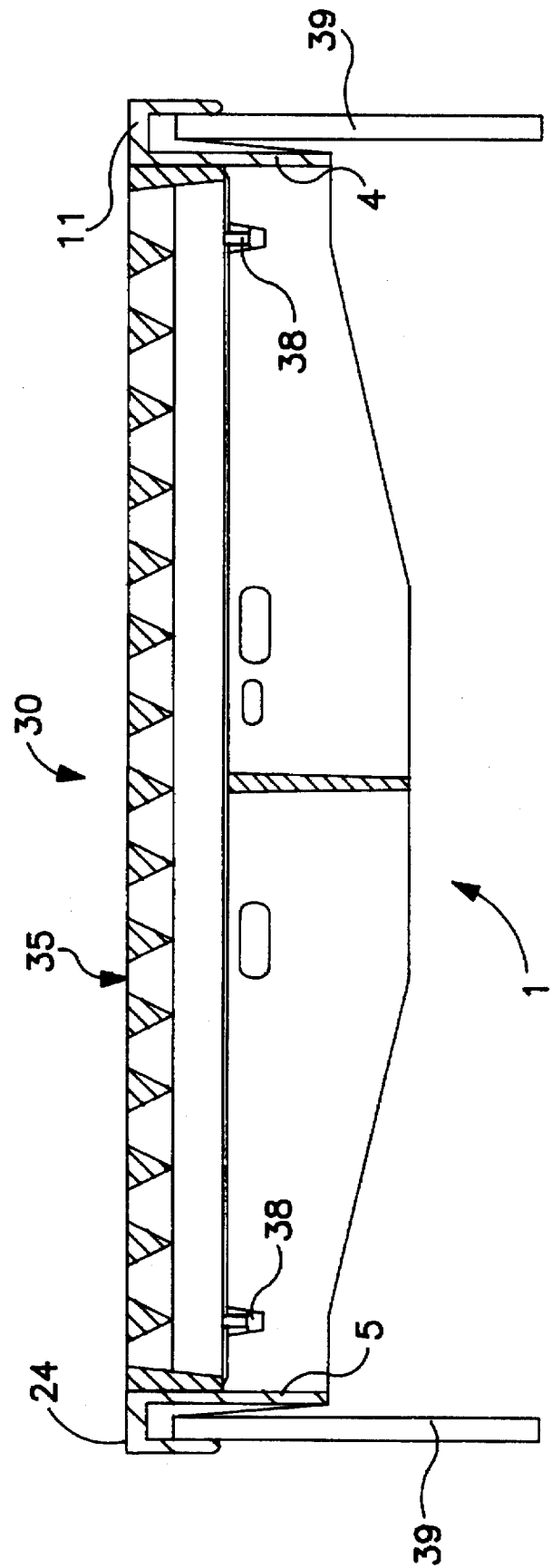
FIG. 4 illustrates a sectional view of a frame element and an insertion element with a first type of devices for fastening the insertion element in the frame element.

FIG. 4 shows a section view of a frame element 1 with an insertion element 30 placed inside. The guide pins 38 of the insertion element are engaged in the corresponding holes 14 in the sides 2, 3 of the frame element. The surface 35 of the insertion element is flush with the surface 24 of the uppermost plane of the frame element, which plane is formed by the top of the sides 4, 5 and the tips of the teeth 11. The U-shaped groove 20 of the frame element is engaged in the support rails in the form of flat irons 39 which are inserted into the groove from below.

Figure 5:
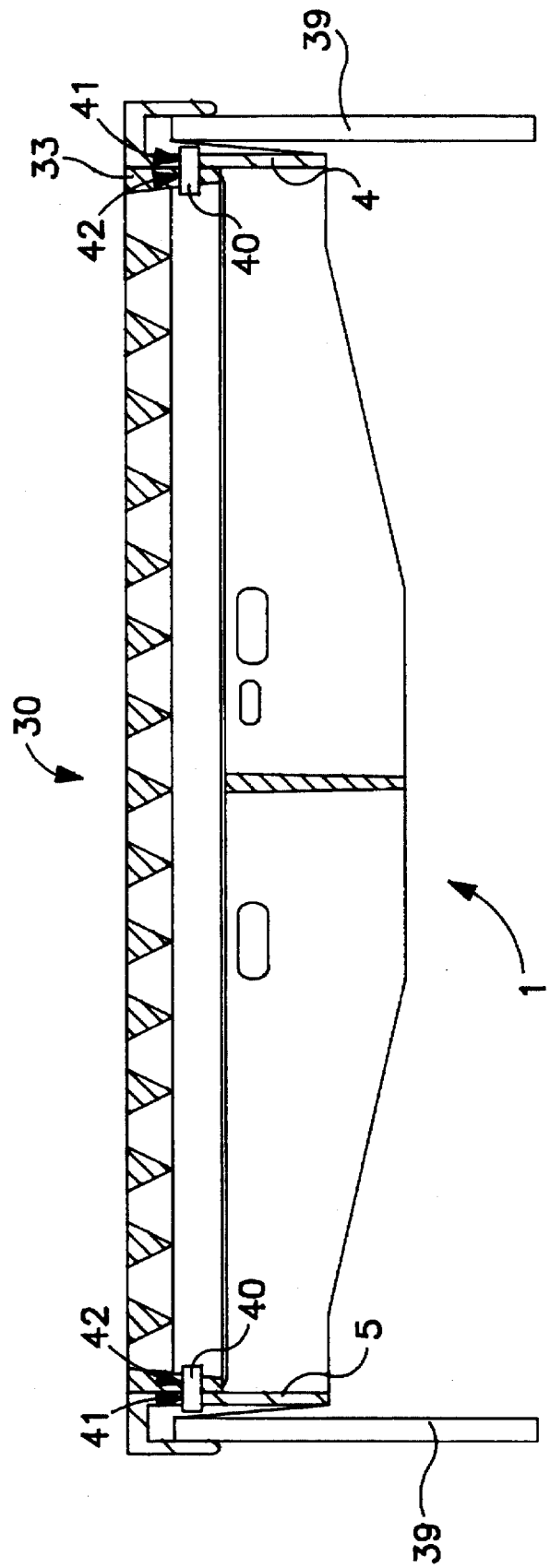
FIG. 5 illustrates a sectional view of an alternative second type of devices for fastening the insertion element in the frame element.

FIG. 5 shows, as an alternative to the use of guide pins 38, the use of lock pins 40 which are placed in through holes 41 in the sides 4, 5 of the frame element 1. The lock pins 40 extend through the holes 41 and continue into holes 42 which are provided horizontally in the side 33 of the insertion element. These lock pins 40 ensure that the insertion element will be displaced horizontally or vertically in relation to the frame element. This means an even safer fastening of the insertion element in the frame element.

Figure 6:
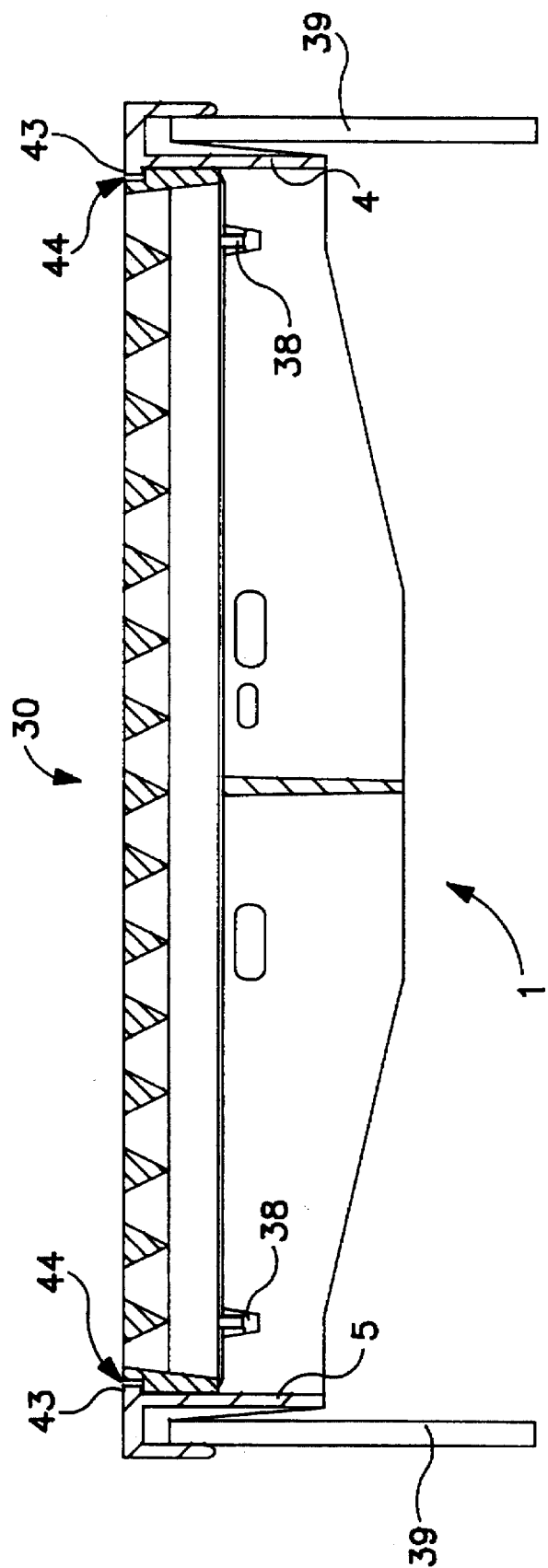
FIG. 6 illustrates a sectional view of a third type of devices for fastening the insertion element in the frame element.

FIG. 6 shows how the insertion element and the frame element may be mutually geared by the use of a combination of guide pins 38 and a snap device provided on the sides 4, 5 of the frame element 1. The guide pins 38 are identical to the ones illustrated and described under FIG. 4. The snap device is constituted by a bead 43 formed on the inside of the sides 4, 5. The insertion element 30 is equipped with a recess 44 corresponding to the bead 43. When the insertion element is mounted in the frame element, the beads 43 on the side 4 and the side 5, respectively, are both pushed apart from each other by a temporary elastic displacement. When the insertion element has been placed correctly, the bead 43 is pushed into the recess 44 and returned to its original position. The insertion element is then retained by the lower surface of the bead 43 being pressed against the upper surface of the insertion element inside the recess 44.

The embodiments illustrated in the figures are all rectangular ones. However, this is not to be seen as a limitation since the insertion elements and the frame elements may have other shapes, e.g. triangular. The specific embodiments illustrated in the figures and the mutual relations between individual parts in the module system according to the invention are not a limitation since many other designs may be deduced from the claims. In particular, it is possible to create many other designs of the devices for fastening the insertion element in the frame element.

We claim:

1. A flooring for stables composed of a plurality of module elements positionable on a support, each module element comprising a four-sided, open bottomed frame element (1) and an insertion element (30) which is supported within said frame element; each said frame element including two opposed pairs of sides, (2,3,4,5) two supporting profiles (6,7) respectively extending between said pairs of opposed sides, and connection means on each side to connect with a connection means of an adjacent frame element, said supporting profiles and the sides of the frame element defining top surfaces (22,23) for supporting the insertion element in the frame element; and each said insertion element defining an upper flooring surface.

2. A flooring according to claim 1, wherein an outside of a pair of opposed sides (4,5) of the frame element (1) is provided with toothings (11) which interact with corresponding toothings on a side of an adjacent frame element, each toothing comprising a U-shaped groove (20) oriented downwards for mounting on a supporting rail (39).

3. A flooring according to claim 1, wherein the insertion element (30) is provided with guide pins (38) which extend from and essentially perpendicularly to a plane formed by outer sides (33,34) of the insertion element, and the frame element includes holes (14) having a shape which is complementary to a shape of the guide pins.

4. A flooring according to claim 1, wherein the frame element (1) and the insertion element (30) include through holes (41,42) and a lock pin (40) is mounted so as to extend through one of the holes of the insertion element and the frame element.

5. A flooring according to claim 1, wherein at least the frame element (1) is made of a plastic material.

6. A flooring according to claim 1, wherein the insertion element (30) is made of a metallic material.

7. A flooring according to claim 1, wherein the insertion element (30) is made of concrete.

8. A flooring according to claim 1, wherein the insertion element (30) is a trough.

9. A flooring according to claim 1, wherein the insertion element (30) forms a grid element which is provided with longitudinal and traverse ribs (31,32).

10. A flooring according to claim 1, wherein the insertion element (30) forms an essentially plane plate element which is provided with devices for temperature control.

* * * * *